(No Model.)
J. M. TURNER.
Cross Cut Sawing Machine.
No. 237,930. Patented Feb. 15, 1881.
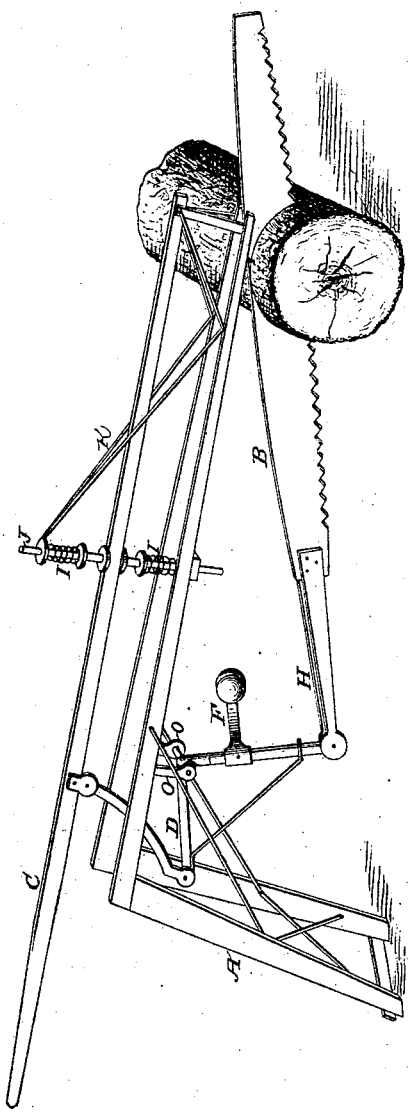

UNITED STATES PATENT OFFICE.

JOSEPH M. TURNER, OF DAYTON, OHIO, ASSIGNOR OF ONE-HALF TO PETER BOHLENDER AND R. P. QUIMBY, OF SAME PLACE.

CROSSCUT-SAWING MACHINE.

SPECIFICATION forming part of Letters Patent No. 237,930, dated February 15, 1881.

Application filed November 11, 1880. (No model.)

*To all whom it may concern:*

Be it known that I, JOSEPH M. TURNER, of Dayton, in the county of Montgomery and State of Ohio, have invented new and useful Improvements in Crosscut-Sawing Machines, of which the following is a specification.

My invention relates to the use of a counterbalance and the recoil of spiral springs to assist in starting the saw at the commencement of each stroke, the same being accomplished by the following-described mechanism, illustrated in the accompanying drawing, in which the figure is a side view of the sawing-machine.

A represents the frame, which is alike in construction to machines of this class. The frame consists of two rails, the front ends being supported on legs, and while in use the rear end rests on the log which is being sawed. Metallic points on the under side of the rails penetrate the timber to hold the log in a fixed position. Two cross-pieces, one near the center of the rails and one near the bottom of the legs, serve to hold the parts of the frame together, and to further strengthen the frame, iron braces connecting the legs and the rails and legs are used.

At the rear end of the frame are two supports, between which the hand-lever C is pivoted.

The vertical rod J is firmly attached to the cross-piece of the rails, and this rod and the supports are held by the stays K, attached to their respective tops. On the rod J are two spiral springs, I, the upper being attached to the head of the brace, and the lower end being attached to a loose washer. The lower spring rests on the cross-piece, and a washer rests on the upper end. This rod passes through an orifice of the lever.

Near the front of the frame are securely attached the arms O. To these arms are pivoted the rectangular arm D. To make this arm more rigid a brace is used connecting the ends. On this arm is bolted the bifurcated arm F, carrying two weights.

E is a curved rod, pivoted to the lever and the rectangular arm, and by means of which movement is communicated from the lever to this arm.

The arm H is pivoted to the rectangular arm, and to the rear end of this arm is bolted the saw B.

The operation is thus: The operator grasps the lever, which he moves up and down, and this gives to the saw a reciprocating motion, and thus the sawing is effected. The weights are so suspended that when the saw has moved the farthest outward, these weights give the greatest gravitating force to aid the saw in the commencement of its return movement. A further aid is given to the saw at the "dead-point" by the recoil of the springs, which are compressed at each full movement of the lever. In this manner the weights and springs so distribute the power applied that the operation of sawing is easier than with a machine not thus provided.

What I claim as my invention, and desire to secure by Letters Patent, is—

In combination with the saw B, hand-lever C, and connecting mechanism, the spring-cushions I I, arranged upon the guide-bar J, upon opposite sides of the lever C, and in the line of its travel, substantially as and for the purpose described.

JOSEPH M. TURNER.

Witnesses:
B. PICKERING,
W. G. TURNER.